(12) United States Patent
Haussmann et al.

(10) Patent No.: US 12,304,316 B2
(45) Date of Patent: May 20, 2025

(54) METHOD FOR OPERATING AN ELECTRIC DRIVE SYSTEM FOR A VEHICLE

(71) Applicant: Mercedes-Benz Group AG, Stuttgart (DE)

(72) Inventors: Moritz Haussmann, Nuertingen (DE); Joerg Weigold, Stuttgart (DE); Maximilian Hepp, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/841,908

(22) PCT Filed: Feb. 28, 2023

(86) PCT No.: PCT/EP2023/054893
§ 371 (c)(1),
(2) Date: Aug. 27, 2024

(87) PCT Pub. No.: WO2023/161497
PCT Pub. Date: Aug. 31, 2023

(65) Prior Publication Data
US 2025/0108698 A1 Apr. 3, 2025

(30) Foreign Application Priority Data
Feb. 28, 2022 (DE) .................. 10 2022 000 711.8

(51) Int. Cl.
*H02P 5/56* (2016.01)
*B60L 15/00* (2006.01)
(Continued)

(52) U.S. Cl.
CPC ........... *B60L 15/007* (2013.01); *H02M 7/539* (2013.01); *H02P 23/00* (2013.01)

(58) Field of Classification Search
CPC .... H02P 3/24; H02P 5/747; H02P 6/06; H02P 6/10; H02P 6/14; H02P 6/34;
(Continued)

(56) References Cited

U.S. PATENT DOCUMENTS 11,165,275 B2   11/2021   Lee et al.
11,351,875 B2   6/2022    Chon et al.
(Continued)

FOREIGN PATENT DOCUMENTS

CN        112937337 A      6/2021
DE   10 2018 000 488 A1    7/2018
(Continued)

OTHER PUBLICATIONS

International Search Report (PCT/ISA/210) issued in PCT Application No. PCT/EP2023/054893 dated Apr. 28, 2023 (2 pages).
(Continued)

*Primary Examiner* — Kawing Chan
*Assistant Examiner* — Charles S Laughlin
(74) *Attorney, Agent, or Firm* — Crowell & Moring LLP

(57) ABSTRACT

A method for operating an electric drive system of a vehicle where the electric drive system has an electric three-phase motor, a battery, and an inverter via which the electric three-phase motor is couplable electrically to the battery. A neutral point of the electric three-phase motor is couplable electrically to a positive pole connection of a direct current charger connection of the electric drive system. A negative potential line of the battery is couplable electrically to a negative pole connection of the direct current charger connection of the electric drive system. The neutral point is couplable electrically via a first switch to the positive pole connection. The negative potential line is couplable electrically via a second switch to the negative pole connection.
(Continued)

The positive pole connection is couplable electrically via a third switch to a tap of an intermediate circuit capacitor.

2 Claims, 3 Drawing Sheets

(51) Int. Cl.
 *H02M 7/539* (2006.01)
 *H02P 6/30* (2016.01)
 *H02P 23/00* (2016.01)
(58) Field of Classification Search
 CPC .......... H02P 7/2885; H02P 8/40; H02P 9/007; H02P 1/265; H02P 1/426; H02P 1/46; H02P 2101/45; H02P 2207/01; H02P 23/0077; H02P 25/089; H02P 4/00; H02P 5/56
 See application file for complete search history.

(56) References Cited

U.S. PATENT DOCUMENTS

| | | |
|---|---|---|
| 2019/0023136 A1 | 1/2019 | Lee et al. |
| 2019/0315234 A1* | 10/2019 | Shin .................. H02J 7/007184 |
| 2021/0044135 A1 | 2/2021 | Lee et al. |
| 2021/0380005 A1* | 12/2021 | Bin .................. H02M 7/53871 |
| 2023/0087317 A1* | 3/2023 | Kim ........................ B60L 53/24 701/31.7 |

FOREIGN PATENT DOCUMENTS

| | | |
|---|---|---|
| DE | 10 2018 207 185 A1 | 11/2019 |
| DE | 10 2018 124 789 A1 | 4/2020 |
| DE | 10 2019 217 666 A1 | 11/2020 |
| EP | 3 461 679 A2 | 4/2019 |
| WO | WO 2019/215128 A1 | 11/2019 |

OTHER PUBLICATIONS

German-language German Search Report issued in German Application No. 10 2022 000 711.8 dated Jul. 4, 2022, with partial English translation (15 pages).
German-language German Office Action issued in German Application No. 10 2022 000 711.8 dated Mar. 10, 2023 (5 pages).
C4 German-language Written Opinion (PCT/ISA/237) issued in PCT Application No. PCT/EP2023/054893 dated Apr. 28, 2023, with English translation (10 pages).

* cited by examiner

METHOD FOR OPERATING AN ELECTRIC DRIVE SYSTEM FOR A VEHICLE

BACKGROUND AND SUMMARY OF THE INVENTION

The invention relates to a method for operating an electric drive system for a vehicle.

An electric drive system for a vehicle and a method for operating it are known from the prior art, as described in DE 10 2018 000 488 A1. The electric drive system comprises at least one electric three-phase motor and a battery for electrical energy supply of the electric three-phase motor. The electric three-phase motor can be coupled or is coupled electrically to the battery via an inverter, wherein a neutral point of the electric three-phase motor can be coupled or is coupled electrically to a positive pole connection of a direct current charger connection of the electric drive system, and a negative pole of the battery can be coupled or is coupled electrically to a negative pole connection of the direct current charger connection of the electric drive system.

Furthermore, a charging device for charging a battery of a motor vehicle, formed with an electric drive engine, having an inductor and a drive inverter is known from DE 10 2018 124 789 A1. In the drive operation of the motor vehicle, the drive inverter converts the direct current of the battery for the electric drive engine, wherein the inductor together with the drive inverter serves as a boost converter for a charging operation of the battery. In addition, a switching unit is provided in the charging device, in order to interconnect a charge source directly or via the boost converter to the battery in a charging operation.

The object of the invention is to specify an improved method in comparison to the prior art for operating an electric drive system for a vehicle.

According to the invention, the object is solved by a method for operating an electric drive system for a vehicle.

An electric drive system for a vehicle has at least one electric three-phase motor, a battery for the electric energy supply of the electric three-phase motor and an inverter, via which the electric three-phase motor can be coupled or is coupled electrically to the battery, wherein a neutral point of the electric three-phase motor can be coupled or is coupled electrically to a positive pole connection of a direct current charging connection of the electric drive system, and a negative potential line of the battery can be coupled or is coupled electrically to a negative pole connection of the direct current charging connection of the electric drive system.

The neutral point of the electric three-phase motor can be coupled or is coupled electrically to the positive pole connection of the direct current charging connection of the electric drive system via a first switch, the negative potential line of the battery can be coupled or is coupled electrically to the negative pole connection of the direct current charging connection of the electric drive system via a second switch, and the positive pole connection of the direct current charging connection of the electric drive system can be coupled or is coupled electrically to a tap of an intermediate circuit capacitor and thus via this to the positive potential line via a third switch.

In the method according to the invention for operating the electric drive system, when the battery is not to be charged from a direct current energy source external to the vehicle, all three switches are opened, for charging the battery from a direct current energy source external to the vehicle, the provided direct current of which corresponds to a nominal voltage of the battery, the first switch and the second switch are closed and the third switch opened, and to charge the battery from a direct current energy source external to the vehicle, the provided direct current of which is smaller than the nominal voltage of the battery, all three switches are closed.

As a result of the described solution, charging the battery is made possible using inductors of the electric three-phase motor, wherein it is here made possible to charge the battery both from a direct current energy source external to the vehicle, the provided direct current of which corresponds to a nominal voltage of the battery of 800V, for example, and from a direct current energy source external to the vehicle, the provided direct current of which is smaller than the nominal voltage of the battery of 800V, for example, is only 400V, for example. Here, for this solution, only minimal effort is required, such that this solution can be implemented in a cost-effective manner.

As described above, to charge the battery from a direct current energy source external to the vehicle, the provided direct current of which corresponds to the nominal voltage of the battery, the first switch and the second switch are closed and the third switch opened. The neutral point is electrically coupled via the closed first switch to the positive pole connection of the direct current charging connection and thus, with a connected direct current energy source external to the vehicle, to the positive pole thereof. The negative potential line is electrically coupled via the closed second switch to the negative pole connection of the direct current charging connection and thus, with a connected direct current energy source external to the vehicle, to the negative pole thereof. With a direct current energy source external to the vehicle connected to the direct current charging connection, the provided direct current of which corresponds to the nominal voltage of the battery, the neutral point and the negative potential line are thus electrically coupled to this direct current energy source external to the vehicle. In addition, all transistors of a region, in particular of an upper region, of the inverter are permanently switched, in order to electrically couple the battery directly to the direct current energy source external to the vehicle. Thus, the battery is charged with the direct current provided by the direct current energy source external to the vehicle and corresponding to the nominal current of the battery.

As described above, to charge the battery from a direct current energy source external to the vehicle, the provided direct current voltage of which is smaller than the nominal voltage of the battery, is only 400V, for example, all three switches are closed. Thus, the neutral point and the negative potential line are electrically coupled to the direct current charging connection and thus, with a connected direct current energy source external to the vehicle, to this. All transistors of the inverter are operated with a pulse width modulation and, in combination with the inductors of the electric three-phase motor, form a boost converter, in order to boost the low direct current voltage provided by the direct current energy source external to the vehicle to the voltage level of the battery, i.e., to its nominal voltage of 800V, for example. Alternatively, also only the transistors of the other region, in particular a lower region, of the inverter can be clocked, such that a current flow does not take place via the transistors of the upper region of the inverter, but via freewheeling diodes of the upper region of the inverter. In addition, the intermediate circuit capacitor, as described above, is advantageously designed in two pieces. As a result of this arrangement, the central point of the capacitor can be switched in parallel to the input of the direct current voltage provided by the direct current energy source external to the vehicle, in order to stabilize it. A separate input capacitor for the charging operation is thus not necessary.

In a possible embodiment, two intermediate circuit capacitors electrically switched in series are provided.

Exemplary embodiments of the invention are explained in more detail below by means of drawings.

DETAILED DESCRIPTION OF THE DRAWINGS

Parts corresponding to one another are provided with the same reference numbers in all figures.

Figure 1:
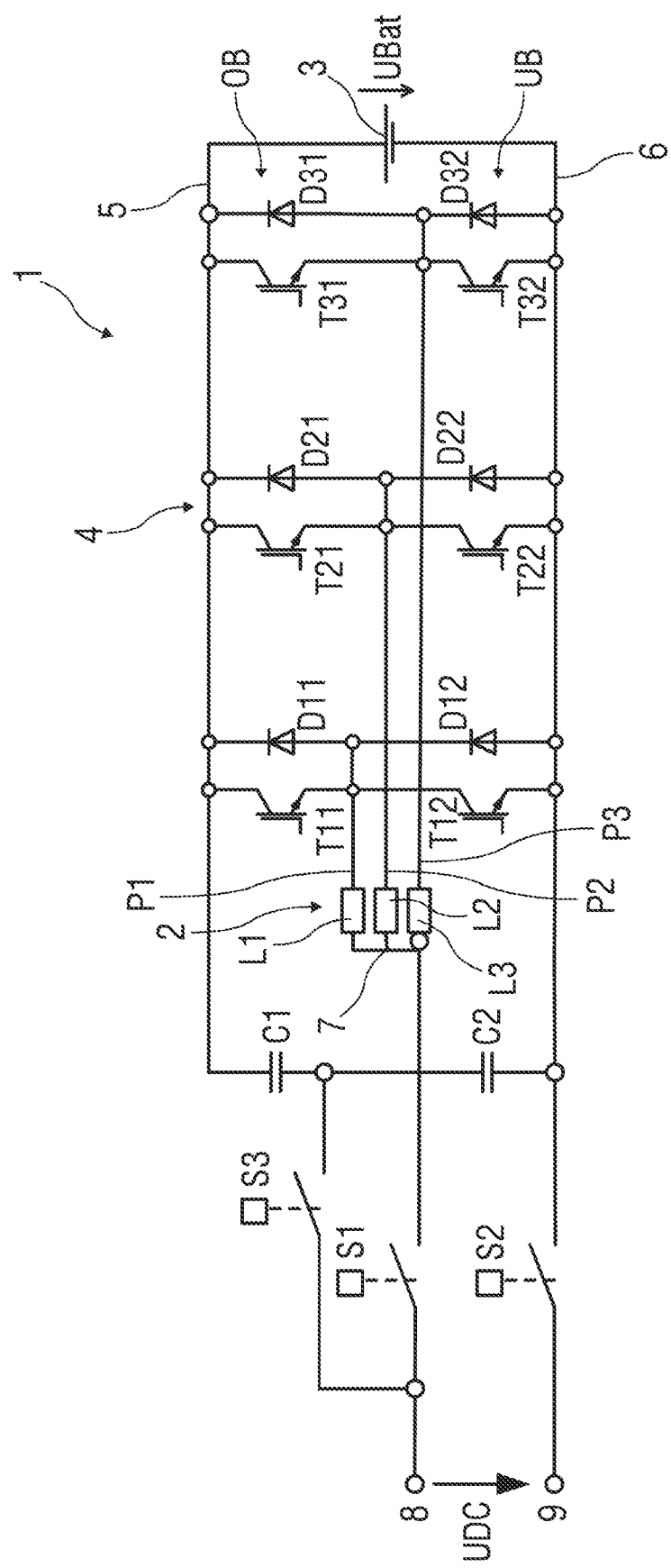
FIG. 1, schematically, shows an electric drive system for a vehicle in a first switching state.
Figure 2:
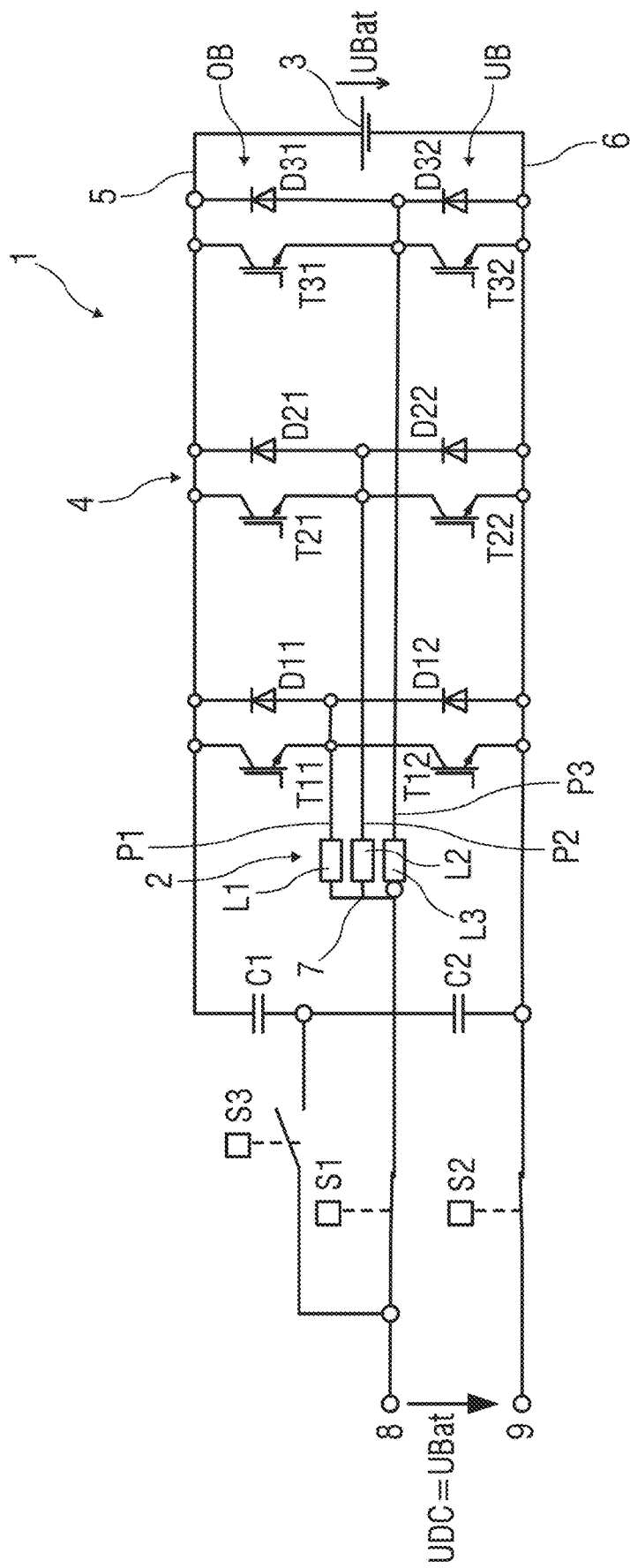
FIG. 2, schematically, shows the electric drive system in a second switching state.
Figure 3:
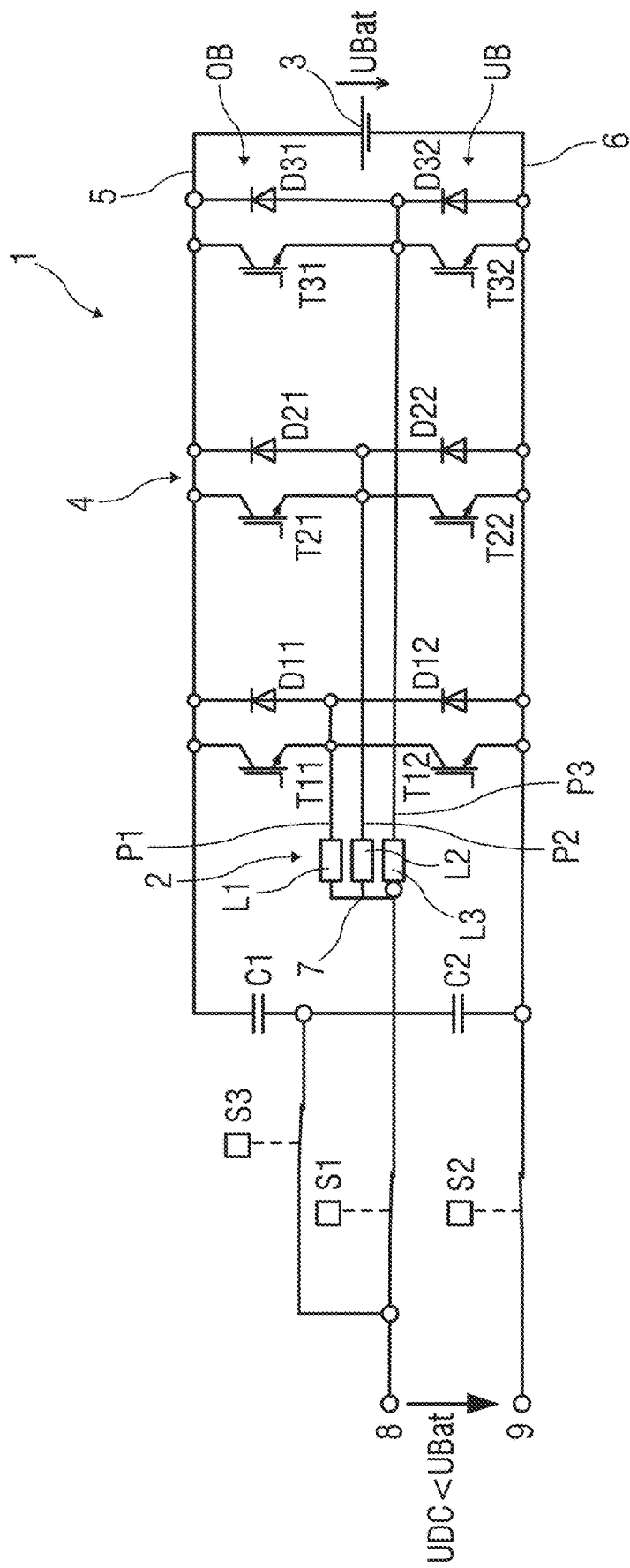
FIG. 3, schematically, shows the electric drive system in a third switching state.

FIGS. 1 to 3 show schematic depictions of an electric drive system 1 for a vehicle in three different switching states.

The electric drive system 1 has an electric three-phase motor 2, a battery 3 for the electric energy supply of the electric three-phase motor 2 and an inverter 4, via which the electric three-phase motor 2 can be coupled or, as shown in FIGS. 1 to 3, is coupled electrically to the battery 3. To do so, the inverter 4 can be coupled or, as shown in FIGS. 1 to 3, is coupled electrically to the battery 3 via a positive potential line 5 and a negative potential line 6 and can be coupled or is coupled electrically to the electric three-phase motor 2 via phase conductors P1, P2, P3.

The inverter 4 has electric series connections of two transistors T11, T12, T21, T22, T31, T32 each and two freewheeling diodes D11, D12, D21, D22, D31, D32 each, which are switched electrically in parallel to each other and are respectively electrically coupled to the positive potential line 5 and the negative potential line 6. The phase conductors P1, P2, P3 are respectively electrically coupled to the electric three-phase motor 2 and a connection line between in each case a pair of the transistors T11, T12, T21, T22, T31, T32 electrically switched in series and the freewheeling diodes D1i, D12, D21, D22, D31, D32 electrically switched in series. The transistors T11, T21, T31 arranged on a side of these coupling points of the phase conductors P1, P2, P3 and freewheeling diodes D11, D21, D31 form an inverter region OB, here an upper one, and the transistors T12, T22, T32 arranged on the other side of these coupling points of the phase conductors P1, P2, P3 and freewheeling diodes D12, D22, D32 form an inverter region UB, here a lower one. A passage direction of the freewheeling diodes D11, D12, D21, D22, D31, D32 is respectively set up in the direction of the positive potential line 5.

The positive potential line 5 and the negative potential line 6 are additionally electrically coupled to two intermediate circuit capacitors C1, C2 electrically switched in series, which are electrically switched in parallel to the inverter 4. This means the solution described here comprises an intermediate circuit capacitor divided into two intermediate circuit capacitors C1, C2.

A neutral point 7 of the electric three-phase motor 2 can be coupled or is coupled electrically to a positive pole connection 8 of a direct current charging connection of the electric drive system 1 via a first switch S1, formed in particular as a contactor, depending on whether the first switch S1 is opened or closed.

The negative potential line 6 can be coupled or is coupled electrically to a negative pole connection 9 of the direct current charging connection of the electric drive system 1 via a second switch S2, formed in particular as a contactor, depending on whether the second switch S2 is opened or closed.

The positive pole connection 8 of the direct current charging connection of the electric drive system 1 can additionally be coupled or is coupled electrically to a connection line of the two intermediate circuit capacitors C1, C2 via a third switch S3, formed in particular as a contactor, depending on whether the third switch S3 is opened or closed, and thus in the closed state of the third switch S3 is electrically coupled to the positive potential line 5 via one of the two intermediate circuit capacitors C1, C2, here via the first intermediate circuit capacitor C1.

By using the described solution, a charging of the battery 3 is made possible via inductors L1, L2, L3 of the electric three-phase motor 2, wherein it is here made possible to charge the battery 3 both from a direct current energy source external to the vehicle, the provided direct current voltage UDC of which corresponds to a nominal voltage UBat of the battery 3 of 800V, for example, as shown in FIG. 2, and to charge it from a direct current energy source external to the vehicle, the provided direct current voltage UDC of which is smaller than the nominal voltage UBat of the battery 3, as shown in FIG. 3. Here, for this solution, only minimal effort is required, such that this solution can be implemented in a cost-effective manner.

In FIG. 1, all three switches S1, S2, S3 are opened. This switching state is advantageously always provided when charging is or charging is still not to take place from a direct current energy source external to the vehicle. As a result of the opened switches S1, S2, S3, both the positive pole connection 8 and the negative pole connection 9 of the direct current charging connection are electrically decoupled from the rest of the electric drive system 1, in particular from the battery 3, the inverter 4 and the electric three-phase motor 2, such that there is no danger of a person coming into contact with the high nominal voltage UBat of the battery 3 that is thus dangerous to health via the direct current charging connection. Should a direct current UDC already be present at the direct current charging connection, for example because it is already electrically coupled to the direct current energy source external to the vehicle, the battery 3 is still not charged by means of the direct current energy source external to the vehicle when the switches S1, S2, S3 are open.

This switching state is also provided for a driving operation of the vehicle. During the driving operation, the electric three-phase motor 2 is provided with electric energy by the battery 3 via the inverter 4.

In FIG. 2, the first switch S1 and the second switch S2 are closed, and the third switch S3 is opened. This switching state is provided to charge the battery 3 from a direct current energy source external to the vehicle, the provided direct current voltage UDC of which corresponds to the nominal voltage UBat of the battery of 800V, for example. The neutral point 7 is electrically coupled via the closed first switch S1 to the positive pole connection 8 of the direct current charging connection and thus, with an attached direct current energy source external to the vehicle, to the positive pole thereof. The negative pole line 6 is electrically coupled via the closed second switch S2 to the negative pole connection 9 of the direct current charging connection and thus, with an attached direct current energy source external to the vehicle, to the negative pole thereof. With the direct current energy source external to the vehicle and connected to the direct current charging connection, the provided direct current voltage UDC of which corresponds to the nominal voltage UBat of the battery 3 of 800V, for example, the neutral point 7 and the negative potential line 6 are thus electrically coupled to this direct current energy source external to the vehicle. In addition, all transistors T11, T21, T31 of the one region, here the upper region OB, of the inverter 4 are permanently switched, in order to electrically couple the battery 3 directly to the direct current energy source external to the vehicle. Thus, the battery 3 is charged with the direct current voltage UDC provided by the direct current energy source external to the vehicle and corresponding to the nominal voltage UBat of the battery 3.

In FIG. 3, all three switches S1, S2, S3 are closed. This switching state is provided to charge the battery 3 from a direct current energy source external to the vehicle, the provided direct current voltage UDC of which is smaller than the nominal voltage UBat of the battery 3 of 800V, for example. For example, the direct current voltage UDC provided by the direct current energy source external to the vehicle is 400V. The neutral point 7 is electrically coupled via the closed first switch S1 to the positive pole connection 8 of the direct current charging connection and thus, with an attached direct current energy source external to the vehicle, to the positive pole thereof. The negative potential line 6 is electrically coupled via the closed second switch S2 to the negative pole connection 9 of the direct current charging connection and thus, with an attached direct current energy source external to the vehicle, to the negative pole thereof. In addition, the positive pole connection 8 of the direct current charging connection and thus, with an attached direct current energy source external to the vehicle, the positive pole thereof is electrically coupled via the closed third switch S3 to the connection line of the two intermediate circuit capacitors C1, C2 and thus via one of the two intermediate circuit capacitors C1, C2, here via the first intermediate capacitor C1, to the positive potential line 5.

With a direct current energy source attached to the direct current charging connection and external to the vehicle, the provided direct current voltage UDC of which is smaller than the nominal voltage UBat of the battery 3 of 800V, for example, the neutral point 7 and the negative potential line 6 are thus electrically coupled to this direct current energy source external to the vehicle, and additionally the connection line of the two intermediate circuit capacitors C1, C2 and thus the positive potential line 5, via one of the two intermediate circuit capacitors C1, C2, here via the first intermediate circuit capacitor C1, are electrically coupled to this direct current energy source external to the vehicle. All transistors T11, T12, T21, T22, T31, T32 of the inverter 4 are operated with a pulse width modulation and, in combination with the inductors L1, L2, L3 of the electric three-phase motor 2, form a boost converter, in order to boost the low direct current voltage UDC provided by the direct current energy source external to the vehicle to the voltage level of the battery 3, i.e., to its nominal voltage UBat of 800V, for example. Alternatively, only the transistors T12, T22, T32 of the other region, here of the lower region UB, of the inverter 4 are also clocked, such that a current flow does not take place via the transistors T11, T21, T31 of the upper region OB of the inverter 4, but via the freewheeling diodes D11, D21, D31 of the upper region OB of the inverter 4. In addition, as already mentioned, the intermediate circuit capacitor is designed in two pieces, in the form of the two intermediate circuit capacitors C1, C2. As a result of this arrangement, the central point of the capacitor can be switched in parallel to the input of the direct current voltage UDC provided by the direct current energy source external to the vehicle, in order to stabilize this. A separate input capacitor for the charging operation s thus not required.

| List of reference characters: | |
|---|---|
| 1 | Drive system |
| 2 | Three-phase motor |
| 3 | Battery |
| 4 | Inverter |
| 5 | Positive potential line |
| 6 | Negative potential line |
| 7 | Neutral point |
| 8 | Positive pole connection |
| 9 | Negative pole connection |
| C1, C2 | Intermediate circuit capacitor |
| D11, D12, D21, D22, D31, D32 | Freewheeling diode |
| L1, L2, L3 | Inductor |
| OB, UB | Inverter region |
| P1, P2, P3 | Phase conductor |
| S1, S2, S3 | Switch |
| T11, T12, T21, T22, T31, T32 | Transistor |
| UBat | Nominal voltage of the battery |
| UDC | Direct current voltage of the direct current |

The invention claimed is:

1. A method for operating an electric drive system (1) of a vehicle, wherein the electric drive system (1) has an electric three-phase motor (2), a battery (3) for electric energy supply of the electric three-phase motor (2), and an inverter (4) via which the electric three-phase motor (2) is couplable electrically to the battery (3), wherein a neutral point (7) of the electric three-phase motor (2) is couplable electrically to a positive pole connection (8) of a direct current charger connection of the electric drive system (1), wherein a negative potential line (6) of the battery (3) is couplable electrically to a negative pole connection (9) of the direct current charger connection of the electric drive system (1), wherein the neutral point (7) is couplable electrically via a first switch (S1) to the positive pole connection (8), wherein the negative potential line (6) is couplable electrically via a second switch (S2) to the negative pole connection (9), and wherein the positive pole connection (8) is couplable electrically via a third switch (S3) to a tap of an intermediate circuit capacitor and thus to a positive potential line (5) of the battery (3), the method comprising the steps of:
    opening the first switch (S1), the second switch (S2), and the third switch (S3) when the battery (3) is not to be charged from a first direct current energy source external to the vehicle;
    closing the first switch (S1) and the second switch (S2) and opening the third switch (S3) to charge the battery (3) from a second direct current energy source external to the vehicle wherein a provided direct current voltage (UDC) of the second direct current energy source external to the vehicle corresponds to a nominal voltage (UBat) of the battery (3); and
    closing the first switch (S1), the second switch (S2), and the third switch (S3) to charge the battery (3) from a third direct current energy source external to the vehicle wherein a provided direct current voltage (UDC) of the third direct current energy source external to the vehicle is smaller than the nominal voltage (UBat) of the battery (3).

2. The method according to claim 1, wherein the intermediate circuit capacitor is configured as two intermediate circuit capacitors (C1, C2) electrically switchable in series.

* * * * *